United States Patent
Yourist

(10) Patent No.: US 6,673,281 B1
(45) Date of Patent: Jan. 6, 2004

(54) METHOD OF DESIGNING AND MANUFACTURING A PLASTIC BLOW-MOLDED CONTAINER

(75) Inventor: Sheldon E. Yourist, York, PA (US)

(73) Assignee: Graham Packaging Company, L.P., York, PA (US)

( * ) Notice: Subject to any disclaimer, the term of this patent is extended or adjusted under 35 U.S.C. 154(b) by 545 days.

(21) Appl. No.: 09/777,726

(22) Filed: Feb. 5, 2001

(51) Int. Cl.[7] .................. B29C 49/52; B29C 33/38; B65D 90/02; G06F 17/50

(52) U.S. Cl. ............ 264/40.1; 264/533; 264/537; 264/219; 345/419; 345/420; 345/584; 345/585; 215/382; 220/675

(58) Field of Search ................ 264/219, 40.1, 264/533, 537; 345/419, 420, 584, 585; 215/382; 220/675

(56) References Cited

U.S. PATENT DOCUMENTS

| | | | |
|---|---|---|---|
| 5,175,806 A | 12/1992 | Muskovitz et al. | 395/125 |
| 5,253,175 A | 10/1993 | Machii et al. | 364/468 |
| 5,369,736 A | 11/1994 | Kato et al. | 395/125 |
| 5,448,687 A | 9/1995 | Hoogerhyde et al. | 395/125 |
| 5,490,080 A | 2/1996 | Jarrige et al. | 364/468 |
| 5,504,845 A | 4/1996 | Vecchione | 395/119 |
| 5,543,103 A | 8/1996 | Hogan et al. | 264/219 |
| 5,841,441 A * | 11/1998 | Smith | 345/587 |
| 6,177,034 B1 * | 1/2001 | Ferrone | 264/40.1 |

OTHER PUBLICATIONS

Six page Brochure of Delcam plc., "DUCT Cadcam Systems for Design and Manufacture", 1995 (unknown month).

* cited by examiner

Primary Examiner—Suzanne E. McDowell
(74) Attorney, Agent, or Firm—Howson and Howson

(57) ABSTRACT

An efficient and cost-effective method of designing and manufacturing a plastic blow molded container having highly artistic sculptural relief. Computer software is utilized to graphically design a container skin shape, create 2-D artwork designs, add 3-D relief to the artwork designs, and apply the artwork to the container skin to develop a desired container. The graphics data of the desired container is utilized to make blow molds which, in turn, are utilized to blow containers. A preferred container is disclosed which has a dome with an intricate fruit basket design.

20 Claims, 6 Drawing Sheets

METHOD OF DESIGNING AND MANUFACTURING A PLASTIC BLOW-MOLDED CONTAINER

FIELD OF THE INVENTION

The present invention relates to a method of designing plastic containers which are formed with highly detailed and artistic decorations, and more particularly, the present invention relates to a method of utilizing a computer-assisted design system to graphically design a highly-artistic and sculptured bottle and to blow-mold a plastic bottle having the artistic sculptural relief.

BACKGROUND OF THE INVENTION

In the packaging of liquids, for instance, juice beverages, recyclable plastic containers are commonly utilized. The containers are typically manufactured in a blow molding process and are made of a thermoplastic material, such as, PET. The containers are filled cold in aseptic environments or are hot-filled as well known in the art. The filled containers are shipped to stores and placed on shelves for purchase by consumers.

Marketing studies have indicated that the appearance of packages have an effect on the purchasing choices made by consumers. Thus, if a container shape appeals to a particular consumer, the consumer is more likely to purchase it. However, for a given product and capacity, conventional plastic blow molded containers typically provide similar appearances. Thus, an efficient method for designing and manufacturing plastic blow-molded containers having highly unique, artistic and sculptured contours is desired.

U.S. Pat. No. 5,543,103 issued to Hogan et al. discloses a process for creating an accurate three dimensional depiction of an object and incorporating it into a wall surface of various products, such as, plastic, glass, or paper containers. The process utilizes a video camera to scan a physical embodiment of an actual object and to convert the video images into a computer data file which can be utilized to control a milling/routing machine to mill the scanned three-dimensional design into a surface of a mold.

U.S. Pat. No. 5,253,175 issued to Machii et al. discloses a method of draw-forming a seamless can which is pre-printed with a design. The method includes transforming digital rectangular coordinates to annular coordinates.

U.S. Pat. No. 5,369,736 issued to Kato et al., U.S. Pat. No. 5,504,845 issued to Vecchione, U.S. Pat. No. 5,448,687 issued to Hoogerhyde et al., and U.S. Pat. No. 5,175,806 issued to Muskovitz et al. disclose computer-assisted design (CAD) systems useful by designers in the footwear, furniture, automotive, aerospace, medical, interior decorating and fashion design industries.

U.S. Pat. No. 5,490,080 issued to Jarrige discloses a method of decorating three-dimensional objects, such as, the skin of airplanes.

In addition, a commercially available software product named ARTCAM is sold by DELCAM plc of Birmingham, England. The software product permits the creation of product designs and the engraving of the designs into molds and dies. Thus, certain products can be designed without the need to make models and prototypes.

Although various of the above referenced methods for using CAD systems to design certain products and/or for using automated methods of tooling molds may be satisfactory for their intended purposes, a need exists for an efficient method of designing and manufacturing a plastic container having surfaces with highly artistic sculptural relief. The plastic container should be capable of being readily designed in an relatively cost-effective manner and efficiently produced in large quantities and in consumer-preferred sizes, such as, 8 ounces to 1 gallon bottle capacities. The plastic containers should be structurally sound and capable of withstanding forces caused by hot-filling, packing, transporting, and ultimate use by consumers.

OBJECTS OF THE INVENTION

With the foregoing in mind, a primary object of the present invention is to provide an efficient and cost-effective method of manufacturing plastic blow molded containers having surfaces with highly artistic sculptural relief.

Another object of the present invention is to provide a method which utilizes CAD system technology to design aesthetically appealing container configurations in an artistic manner.

A further object of the present invention is to provide a bottle design and manufacturing method which eliminates the need for making models and prototypes and for generating imagery/computer data from actual models and prototypes in order to tool the blow mold cavities in an automated manner.

A still further object is to provide a plastic blow-molded container having a surface with highly artistic sculptural relief.

SUMMARY OF THE INVENTION

The present invention provides a novel method of designing and manufacturing a container having artistic sculptural relief. A three dimensional graphic image corresponding to an undecorated shape of the skin of at least a section of the container and an artistic two-dimensional graphic image corresponding to a desired decoration for the container are created in a CAD system. Sculptural relief is added to the planar two dimensional graphic image to generate a generally planar contour map having raised and/or lowered areas of relief. The contour map is then graphically applied to the undecorated skin image of a section of the container to generate a three dimensional graphic image of a section of a decorated container. Preferably, the contour map is graphically wrapped onto the skin or graphically projected onto the skin.

The three dimensional graphic image of the decorated container is utilized to machine a blow mold, and a thermoplastic material is blown in the blow mold to form a container having the artistic structural relief depicted in the three dimensional image of the decorated container.

According to another aspect of the present invention, a plastic blow-molded container is provided which has been produced by the method of the present invention.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

Before turning to the unique aspects of the method of the present invention, a discussion concerning an example of a container which can be produced by the method is believed to be in order.

Figure 1:
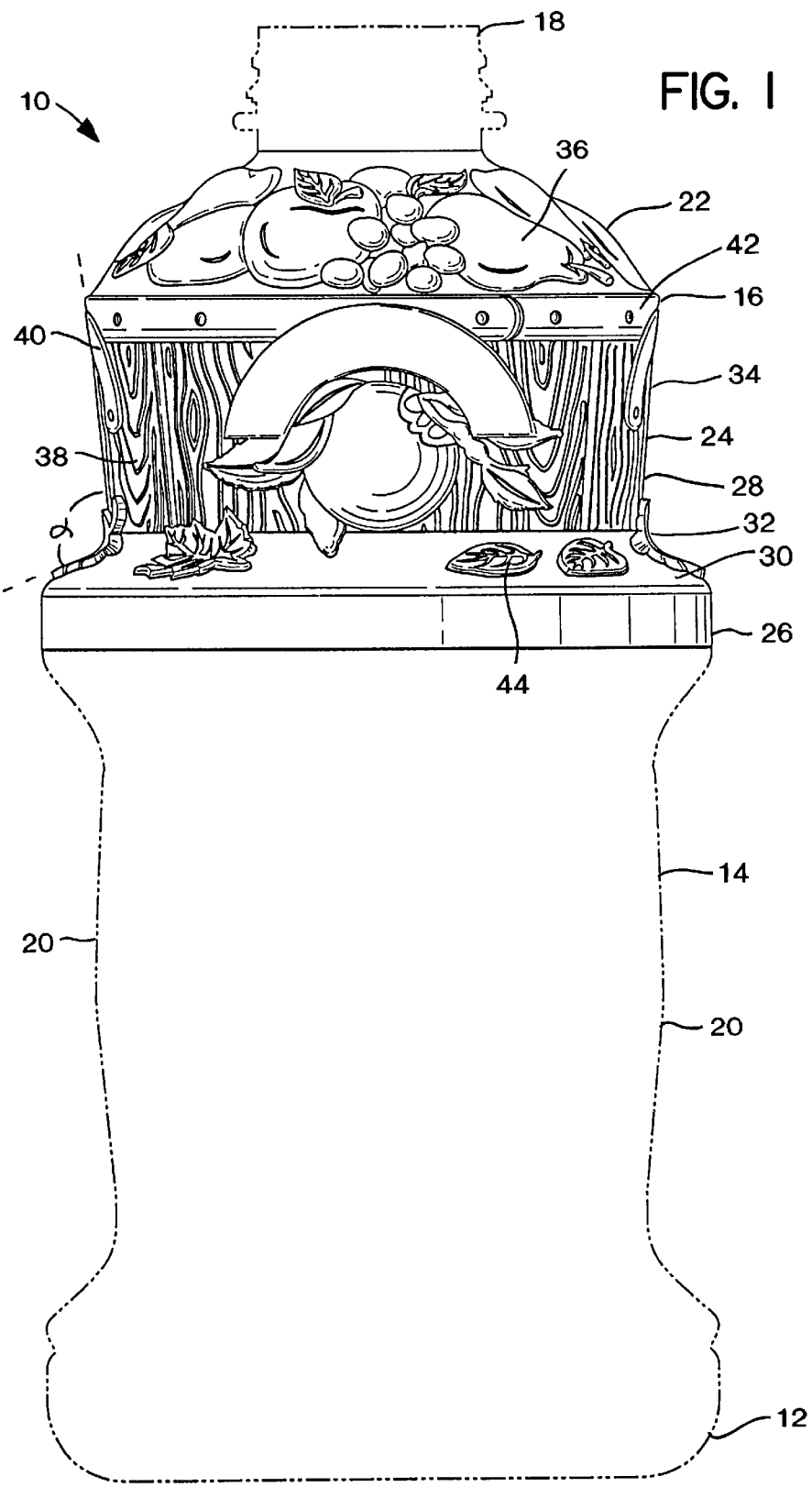
FIG. 1 is an elevational view of a dome of a container produced by the method of the present invention, the remaining parts of the container body being illustrated in phantom lines.

FIG. 1 illustrates one example of a plastic container 10 which can be made from the method of the present invention. The one-piece plastic container 10 is preferably made from PET, or a like thermoplastic material, and is produced by injection blow molding techniques. The container 10 is particularly suited for use in packaging 64 ounces of juice; however, the container can be manufactured to contain 8 ounces to one gallon of any liquid product. Alternatively, the container can be made by extrusion blow molding techniques and can be made of alternate thermoplastic materials such as HDPE, PP, PE and the like.

Structurally, the container 10 has a base 12, a sidewall 14 projecting upwardly and continuously from the base 12, and a dome 16 projecting upwardly from the sidewall 14. The dome 16 has an upstanding threaded finish 18 to which a closure, or cap, (not shown) can be applied.

The sidewall 14, illustrated in phantom in FIG. 1, is substantially cylindrical and has a pair of grippable flex panels 20. The sidewall 14, for example, could be similar in shape and function to the sidewall configurations disclosed in U.S. Pat. No. 5,598,941 issued to Semersky et al. and U.S. Pat. No. 5,392,937 issued to Prevot et al., which are both incorporated herein by reference. The flex panels 20 provide a location for ready gripping of the container and accommodate internal vacuum created when the container 10 is hot-filled, sealed and cooled. Alternatively, other flex panel structures can be utilized, such as, three or more circumferentially-spaced flex panels, or, if the container is cold-filled, the container can be formed without flex panels. In addition, the sidewall 14 can be provided in various multi-sided shapes, for instance, with a substantially square horizontal cross-section.

The dome 16 illustrated in FIG. 1 includes a top, or upper, portion 22 which surrounds the finish 18 and which tapers downwardly from the finish in a convex shape. A lower portion 24 of the dome 16 interconnects the upper dome portion 22 to the sidewall 14 via a bumper 26. The lower dome portion 24 includes an inwardly tapering frustoconical section 28 depending from the upper dome portion 22 and a subjacent oppositely tapering frustoconical section 30 extending to the sidewall bumper 26. The interconnection of the frustoconical sections 28 and 30 forms a waist 32 which provides an additional place to readily grip the container 10. The angle "α" formed between the frustoconical sections 28 and 30 is greater than 90°, preferably 120°.

Aesthetically, the dome 16 is provided with a highly unique and artistic design. The above-described dome structure is provided with sculptural relief to create the appearance of a wooden basket 34 filled with fruit 36. To this end, sculptured three-dimensional artwork is formed in the frustoconical section 28 to resemble a plurality of wooden-planks 38 which, in turn, form the basket 34. The basket 34 also includes a pair of handles 40 and a top peripheral rail 42. The upper dome portion 22 has three-dimensional artwork resembling pieces of fruit 36 located adjacent the top of the basket 34. In addition, three-dimensional artwork of leaves 44 are located along the bottom of the basket 34 and extend across the waist 32 of the dome and onto the lower frustoconical section 30. Logos corresponding to the trade name of the product being packaged by the container 10 can also be provided in an artistic three-dimensional manner. Thus, substantially the entire surface of the dome 16, between the finish 18 and the sidewall bumper 26, is provided with three-dimensional art work.

The container 10 provides a highly unique package for a product which, from a marketing standpoint, provides an interesting, highly artistic, eye-catching design relative to other generic container shapes. In the illustrative example, the dome design is particularly suited for packaging a fruit juice product. Of course, the dome, or other portions of the container, can be provided with an infinite number of artistic, intricate, three-dimensional designs, and the shape of the dome, or container, can likewise be modified as permitted by known blow-molding processes and the molding properties of the thermoplastic material.

DETAILED DESCRIPTION OF THE PREFERRED METHOD

According to the present invention, the entire design process is accomplished via a computer which ultimately provides the required data to automated mold milling/routing machinery which form the desired surface in the cavity walls of blow molds. Thus, the container 10 illustrated in FIG. 1 can be designed and manufactured in an efficient manner without the need for hand sculpting a prototype or actual model. Although the design is highly artistic, intricate and unique, the container can be designed and made in a relatively short period of time and in a cost-effective manner.

The first step 60 in the method is to determine the container shape and design concept. For example, in the design of container 10, a fruit basket design was desired for a fruit juice package. It was also desirable that the dome 16 of container 10 be provided in a basket-shape so that, when sculptural relief is added to the dome, it resembles a basket of fruit. Other considerations include the shape of the other container structures, for instance, the shape of the sidewall, flex panels, grips and label panels.

Figure 2:
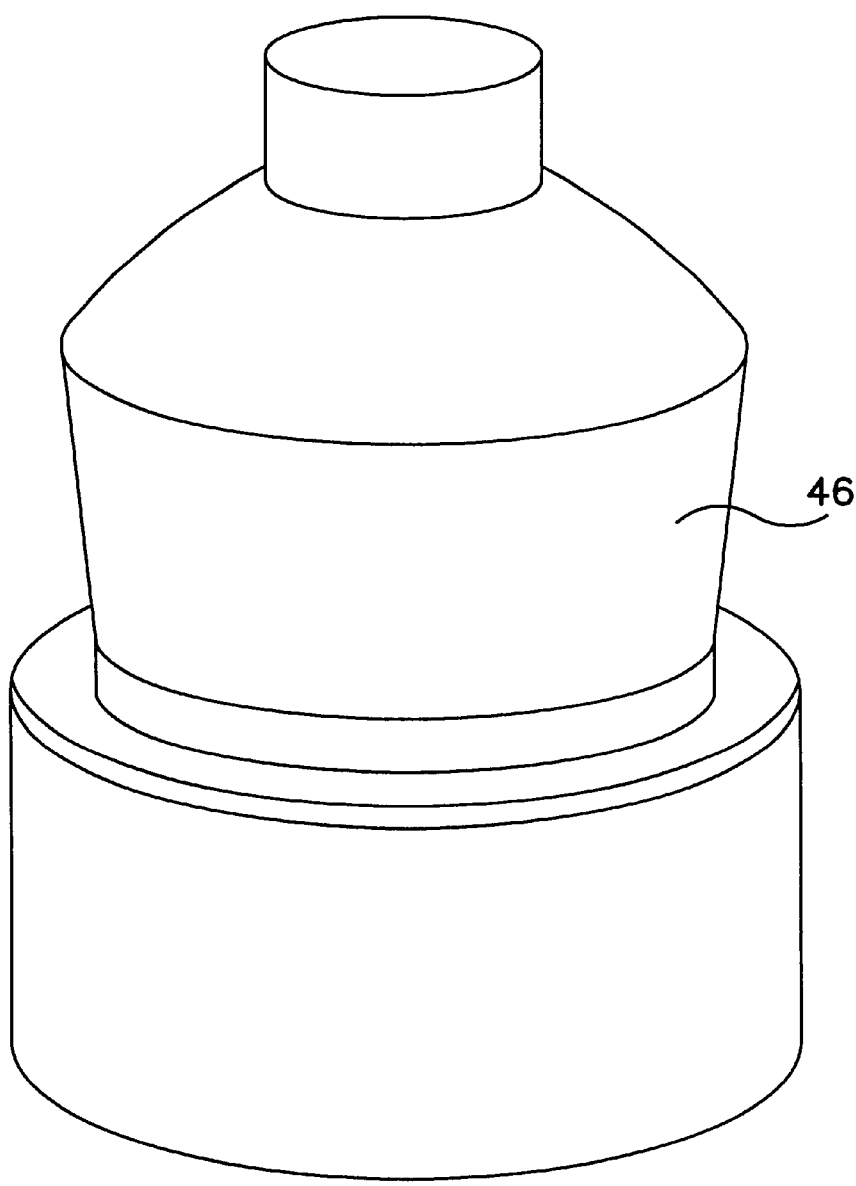
FIG. 2 is a perspective view of the undecorated skin of the container dome illustrated in FIG. 1.
Figure 6:
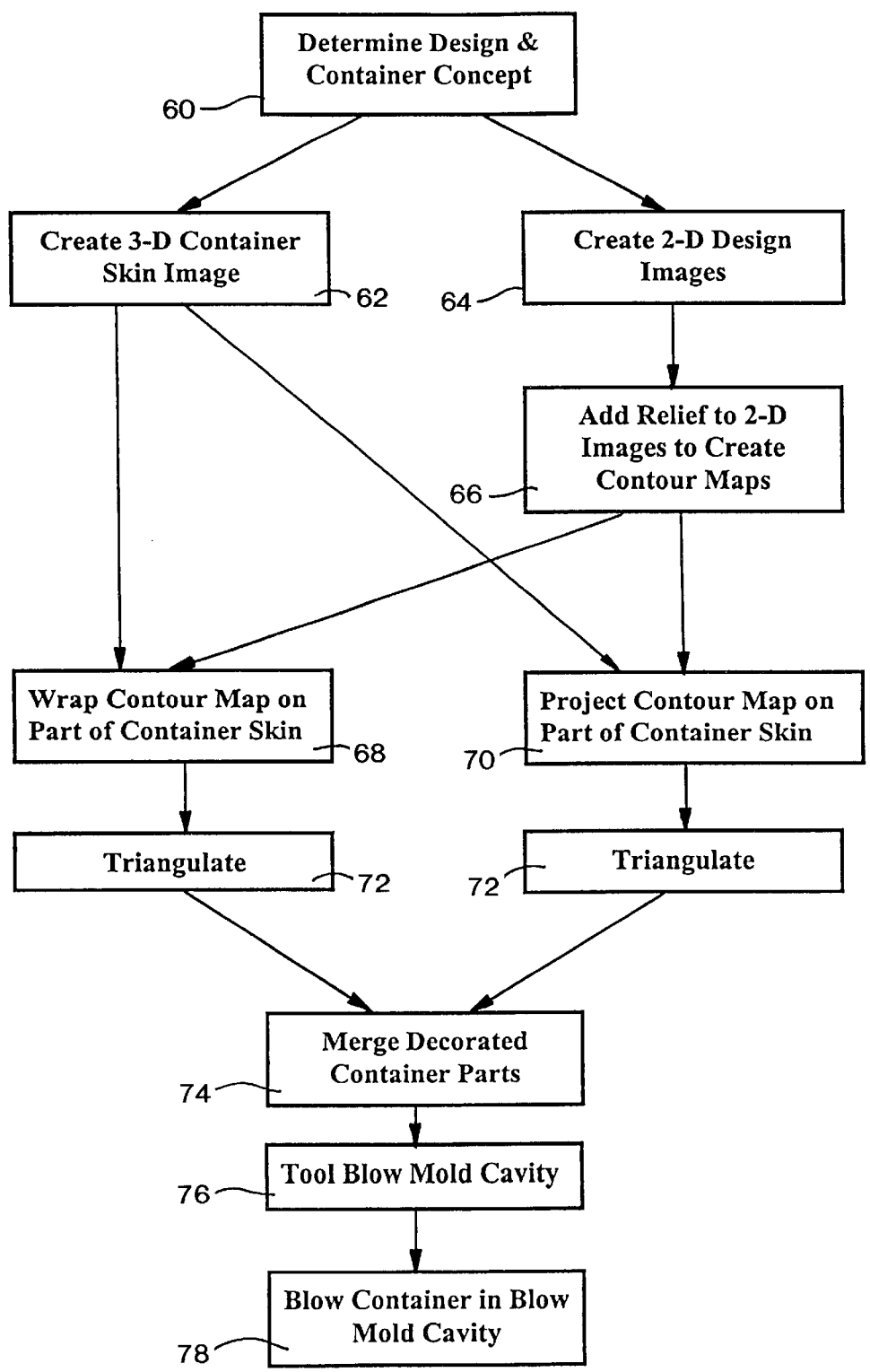
FIG. 6 is a flow chart of the steps of the method of the present invention.

A three-dimensional graphic image 46 of the skin of the container is formed on a CAD system. See step 62 in FIG. 6. The 3-D skin image 46 corresponds to the undecorated shape of the container, or at least a portion of the container. For example, FIG. 2 illustrates the smooth outer skin 46 of the dome.

Figure 3:
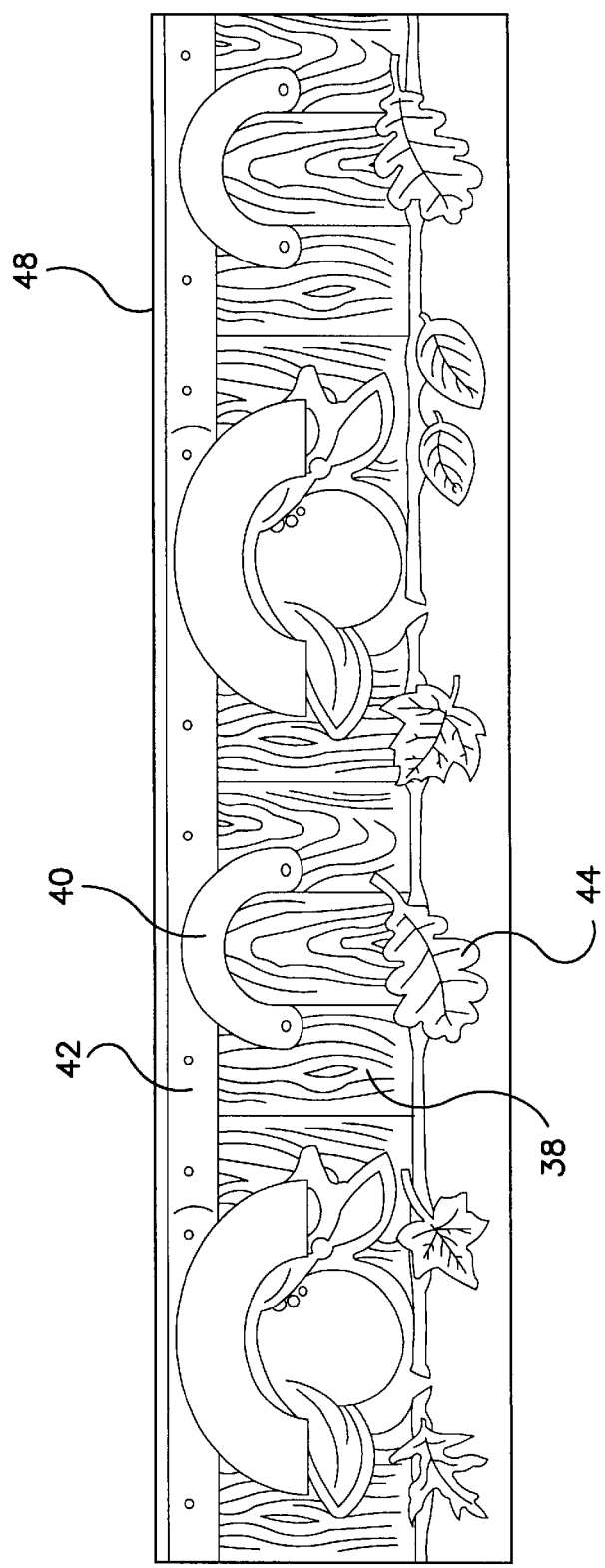
FIG. 3 is an elevational view of a two-dimensional artistic design.

A two-dimensional graphic image 48 corresponding to the decoration, or design concept, of the container is formed on a CAD system using known techniques, such as, free-hand drawing with a mouse and mouse pad or copying an existing graphic element. See step 64 in FIG. 6. The 2-D image 48 is planar and is dimensioned to fit onto the corresponding non-planar surface of a part of the container skin 46. The 2-D image 48 can consist of one image or a plurality of merged overlying graphic images. In addition, various 2-D images can be created for different sections of the container 10. For example, the basket 34 of container 10 is created in one image, see FIG. 3, and the fruit 36 is created in a separate image file.

Sculptural relief 50 is added via computer software to each planar 2-D image to create a contour map for each image. See step 66 in FIG. 6. Thus, selected portions of each 2-D design image extend out of the plane of the 2-D image a pre-determined extent. For instance, the fruit 36, rail 42, handles 40 and leaves 44 may be provided with relief such that they project outwardly from the plane to provide a 3-D sculptural effect. Likewise, the grain in the wooden planks 38 are recessed in an opposite transverse direction relative to the plane of the 2-D image. An example of software useful for adding relief to 2-D images is ARTCAM sold by DelCam.

The method steps 64 and 66 for creating a 2-D design image and adding relief to the 2-D image can be accomplished sequentially or substantially simultaneously. For example, each design element in the 2-D image can be created separately and be separately provided with relief before various parts of the design image are merged to form a finished contour map. In either case, the result is a substantially planar, strip-like or sheet-like, image having portions of the image extending out of the 2-D plane.

Figure 4:
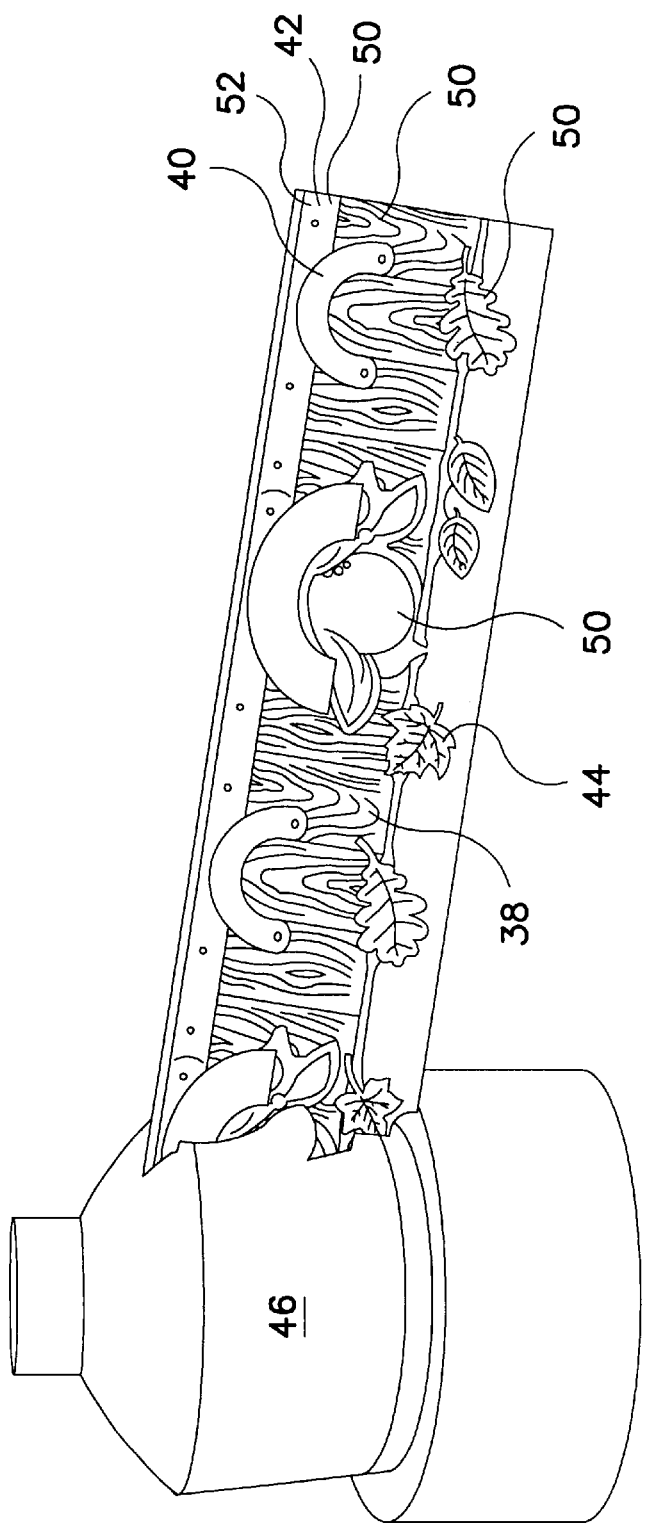
FIG. 4 is a perspective view of an artistic design which has relief and which can be graphically wrapped about a portion of the image of the skin of the container.
Figure 5B:
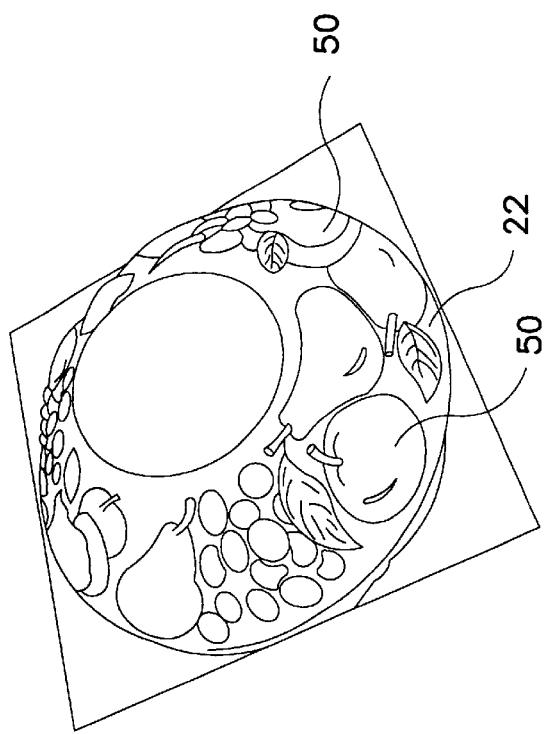
FIG. 5B is a perspective view of the artistic design illustrated in FIG. 5A graphically projected onto a portion of the image of the skin of the container.
Figure 5A:
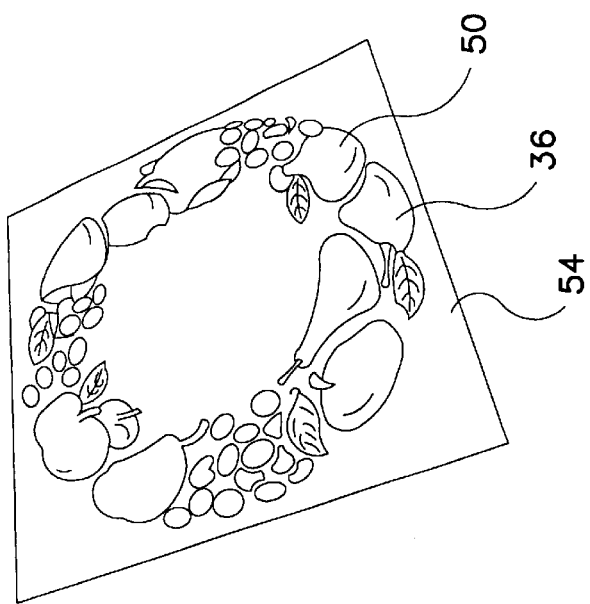
FIG. 5A is a perspective view of an artistic design on a flat surface which has relief.

FIG. 4 illustrates a contour map 52 of a basket 34 and FIG. 5A illustrates a contour map 54 of fruit 36.

The contour map, or contour maps, 52 and 54 are graphically applied to the 3-D skin image 46, or portions thereof via various graphical techniques. Each contour map is applied separately to a corresponding part of the container. For instance the basket 34 is applied to the lower dome portion 24 and the fruit 36 is applied separately to the upper dome portion 22.

The strip-like contour map 52 of the basket 34 is graphically mapped/wrapped, substantially 360°, around the lower dome portion 24. Conceptually, the mapping step 68 is similar to wrapping an elongate strip-shaped label about the periphery of a bottle, except in the present invention, the wrapping is accomplished in a virtual environment, ie. a contour map about a 3-D graphical image of a container skin. The wrapped contour map 52 covers substantially the entire lower dome portion 24 and conforms to the general shape of the corresponding container skin 46. To this end, the contour map 52 is wrapped over the pair of oppositely tapering frustoconical sections, 28 and 30, such that the basket 34 is wrapped on the frustoconical section 28, while the leaves 44 extend across the waist 32 and onto the lower frustoconical section 30.

The contour map 54 of the fruit 36 is projected onto the upper dome portion 22 adjacent the finish 18. See step 70 in FIG. 6. The projected contour map 54 assumes the convex shape of the upper dome portion 22. See FIG. 5B.

After the contour maps 52 and 54 are wrapped or projected onto corresponding container parts, each container part is triangulated using known mathematical triangulation techniques. See step 72 in FIG. 6. During triangulation, the computer software determines a series of points of triangles which are utilized by automated mold milling/routing equipment to cut the design into the mold cavity.

After the various decorated and non-decorated container parts are triangulated, the various parts are graphically pieced together in three-dimensions on a CAD system. See step 74 in FIG. 6. For instance, the upper dome portion 22 which has been decorated with fruit 36 is mated with the lower dome section 24 which has been decorated with a basket 34 and leaves 44. The sidewall 14, base 12 and finish 18 of the container 10 are mated with the dome 16 to form a complete triangulated container graphic. The data of this graphic image is utilized to mill/route the mold cavity (step 76 in FIG. 6) which, in turn, is utilized to blow plastic containers (step 78 in FIG. 6).

Thus, the method of the present invention, permits the design and manufacture of containers having intricate, unique and highly artistic sculptural relief Various known CAD software products are utilized in conjunction to graphically design the container shape, create artwork having 3-D relief, and apply the artwork to the skin to develop a desired container. The graphics data is utilized to make blow molds which, in turn, are utilized to make containers. In the disclosed embodiment, the dome of the container was substantially completely covered with the artwork and relief.

While a preferred method of design and manufacture of a container and a preferred container have been described in detail, various modifications, alterations, and changes may be made without departing from the spirit and scope of the present invention as defined in the appended claims.

What is claimed is:

1. A method of designing and manufacturing a container having portions thereof with artistic sculptural relief, comprising the steps of:

creating a three dimensional graphic image corresponding to an undecorated shape of the skin of at least a section of the container;

creating an artistic two-dimensional graphic image on a plane corresponding to decoration for at least a portion of the container;

adding sculptural relief to said planar two dimensional graphic image to generate a contour map such that areas of the planar image are raised or lowered in a transverse direction relative to said plane; and generating a three dimensional graphic image of a decorated container by graphically applying said contour map to said three dimensional graphic image of said section of said container skin.

2. A method according to claim 1, further comprising the steps of utilizing said three dimensional graphic image of the decorated container to machine a blow mold, and blow molding a thermoplastic material in said blow mold to make the container, whereby the plastic blow-molded container is formed in a shape having the artistic structural relief depicted in said three dimensional image of the decorated container.

3. A method according to claim 1, wherein said contour map is graphically applied by graphically wrapping said substantially-planar relief-containing contour map circumferentially around said three dimensional graphic image of said container skin.

4. A method according to claim 3, wherein said contour map is wrapped substantially 360° about the circumference of said graphic image of said skin.

5. A method according to claim 4, wherein said wrapped contour map forms a continuous band about said skin.

6. A method according to claim 1, wherein said contour map is graphically applied by graphically projecting said substantially-planar relief-containing contour map on a non-planar portion of said three dimensional graphic image of said container skin.

7. A method according to claim 6, wherein said section of said skin of the container includes a section of a container dome which surrounds a container finish; and wherein said contour map is projected on said skin of the container dome adjacent said finish.

8. A method according to claim 7, wherein said substantially-planar, relief-containing contour map is ring shaped and, when projected onto said skin of said container dome, forms a continuous, substantially 360°, circumferential band adjacent and surrounding said finish.

9. A method according to claim 1, wherein various different container sections of said undecorated skin are created in three dimensional graphic images and various contour maps are generated for said skin sections; and wherein, after said contour maps are graphically applied to said skin sections, said sections are graphically fit together.

10. A method according to claim 9, wherein one of said skin sections includes a top portion of a container dome surrounding a container finish and another of said skin sections includes an adjacent circumferential portion of said container dome;

wherein one of said contour maps is graphically projected onto said skin section of said top portion of said container dome and wherein another of said contour maps is graphically wrapped around said skin section of said circumferential portion of said container dome.

11. A method according to claim 10, wherein approximately the entire skin of said container dome is applied with a contour map, whereby the resulting blow molded container has a dome with artistic sculptural relief formed on substantially the entire surface thereof.

12. A method according to claim 9, wherein, after said contour maps are graphically applied to said skin sections and before said sections are graphically fit together, each of said sections which have been applied with one of said contour maps is triangulated.

13. A method of designing and manufacturing a container having at least a portion formed with highly artistic sculptural relief, comprising the steps of:

using a computer-assisted design system to create at least two separate three dimensional graphic images of different undecorated skin sections of the container;

using said computer-assisted design system to create at least two artistic two-dimensional graphic images, each of said artistic two-dimensional images being formed on a plane and corresponding to a decoration for one of said container skin sections;

using said computer-assisted design system to add sculptural relief to said two dimensional graphic images to generate contour maps such that each contour map is substantially planar having areas which extend in at least one transverse direction out of said plane;

using said computer-assisted design system to graphically apply said contour maps to said undecorated skin sections to create at least two three-dimensional graphic images of different decorated container sections;

triangulating each of said three dimensional graphic images of said decorated container sections;

graphically bringing together, after said triangulating step, said different decorated container sections and graphically forming a unitary container structure image;

utilizing said unitary container structure image in an automated process to machine a blow mold; and blow molding a thermoplastic material in said blow mold to form a container.

14. A method according to claim 13, wherein at least one of said contour maps is graphically applied by being graphically wrapped substantially 360° about the circumference of said three dimensional graphic image of one of said container skin sections thereby forming a substantially continuous band thereon.

15. A method according to claim 13, wherein at least one of said contour maps is graphically applied by being graphically projected onto said three dimensional graphic image of one of said container skin sections.

16. A method of designing and manufacturing a plastic container having a dome formed with highly artistic sculptural relief, comprising the steps of:

using a computer-assisted design system to create at least two separate three dimensional graphic images of different undecorated skin sections of the container dome;

using said computer-assisted design system to create at least two artistic two-dimensional graphic images, each of said artistic two-dimensional images being formed on a plane and corresponding to a decoration for one of said container dome skin sections;

using said computer-assisted design system to add sculptural relief to said two dimensional graphic images to generate contour maps such that each contour map is substantially planar having areas which extend in at least one transverse direction out of said plane;

using said computer-assisted design system to graphically apply said contour maps to said undecorated some skin sections to create at least two three-dimensional graphic images of different decorated container dome sections;

triangulating each of said three dimensional graphic images of said decorated container dome sections;

graphically bringing together, after said triangulating step, said different decorated container dome sections and graphically forming a unitary container dome structure image;

utilizing said unitary container dome structure image in an automated process to machine a blow mold; and blow molding a thermoplastic material in said blow mold to form a container.

17. A method according to claim 16, wherein said three dimensional graphic images of different undecorated skin sections of the container dome include an upper dome portion and a lower dome portion; and wherein one of said contour maps is graphically applied to said lower portion by being graphically wrapped substantially 360° about said lower portion.

18. A method according to claim 17, wherein at least one of said contour maps is graphically applied to said upper dome portion by being graphically projected onto said upper dome portion.

19. A container designed and manufactured according to the method of claim 2.

20. A container according to claim 19, wherein the container has a sidewall with at least one vacuum flex panel.

* * * * *